Sept. 18, 1951     A. W. LANE     2,567,948
STARTING ARRANGEMENT FOR GYRO VERTICALS
Filed June 17, 1949     2 Sheets-Sheet 2
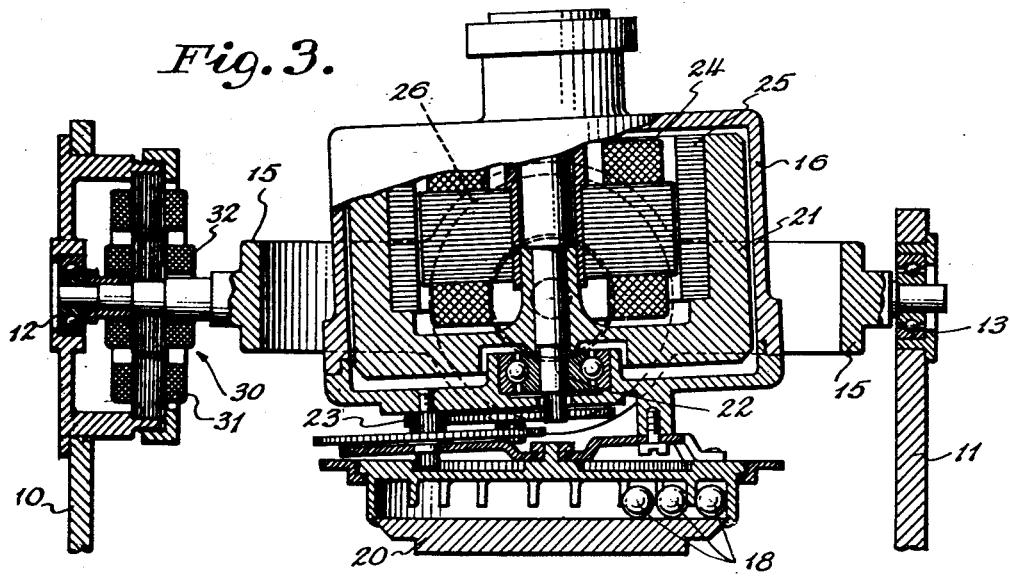
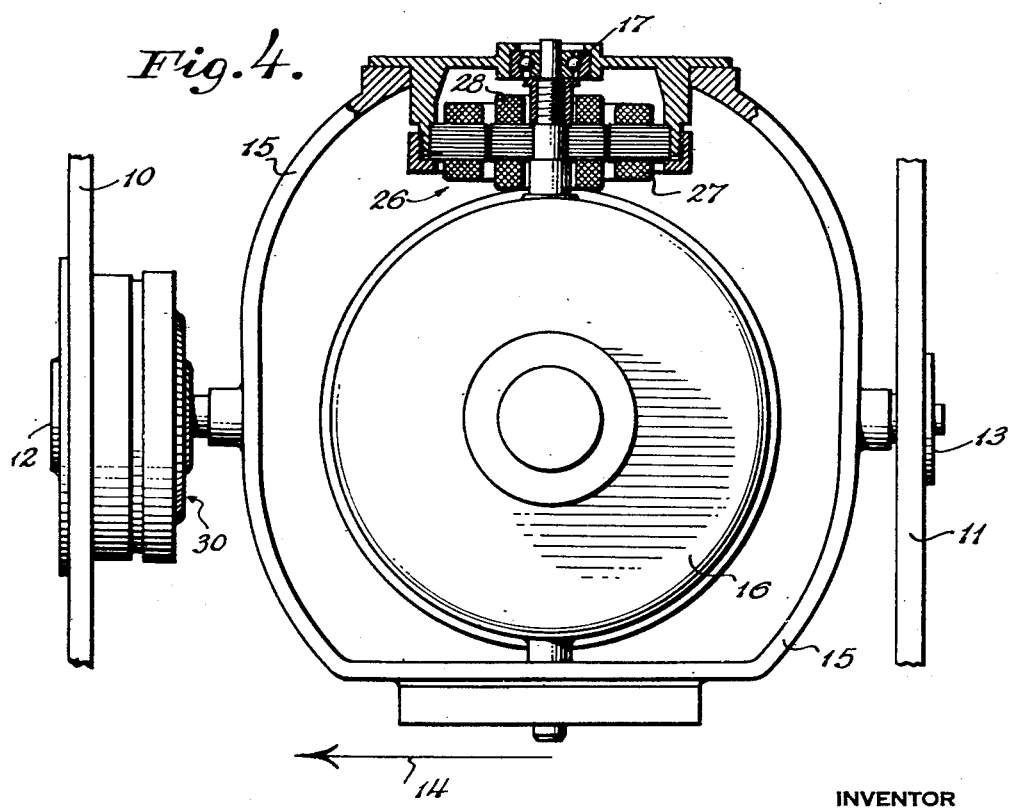
INVENTOR
ARTHUR W. LANE
BY Arthur H. Serrell
ATTORNEY Patented Sept. 18, 1951

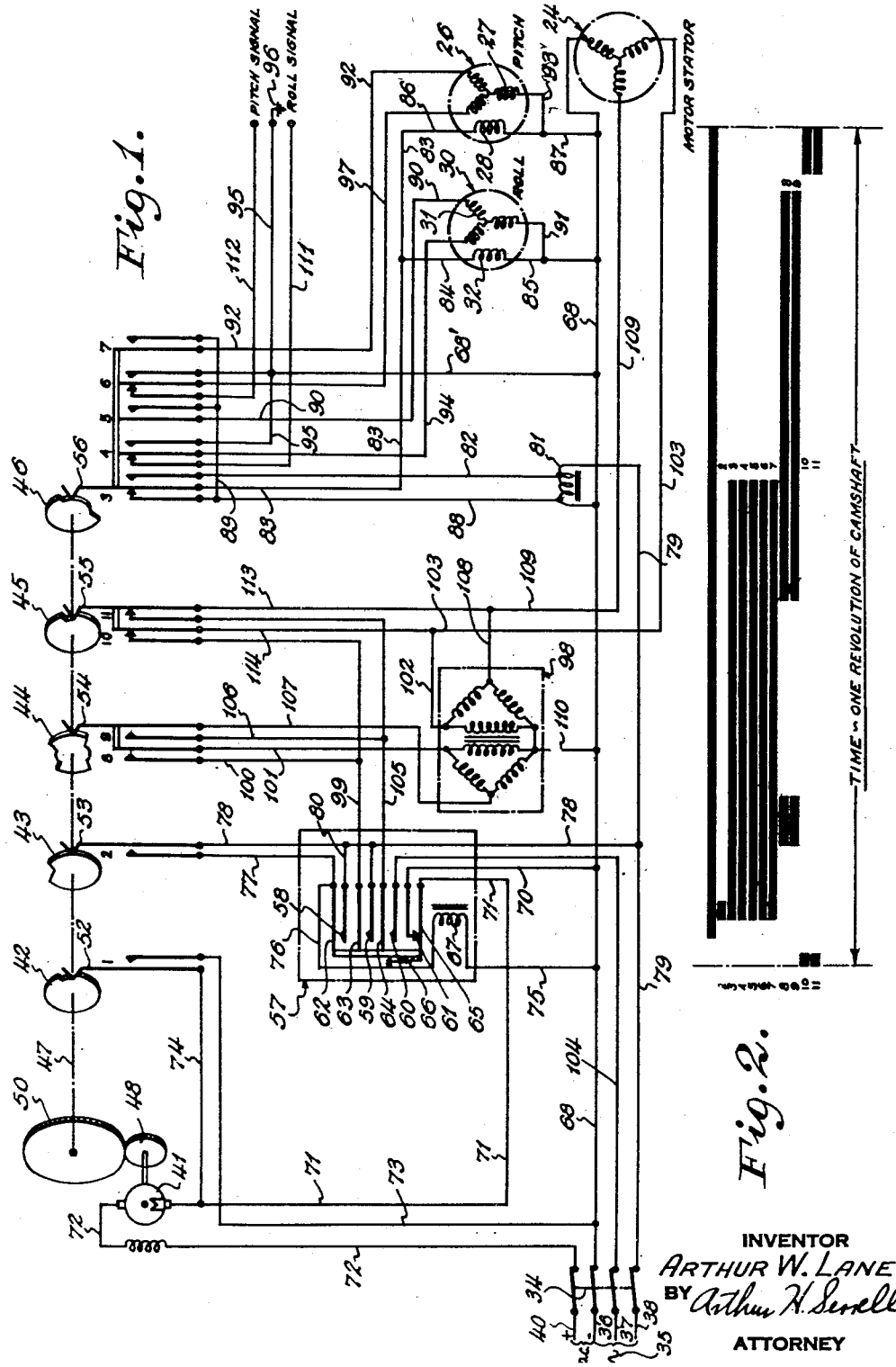

2,567,948

UNITED STATES PATENT OFFICE 2,567,948

STARTING ARRANGEMENT FOR GYRO VERTICALS

Arthur W. Lane, Roosevelt, N. Y., assignor to The Sperry Corporation, Great Neck, N. Y., a corporation of Delaware Application June 17, 1949, Serial No. 99,636

12 Claims. (Cl. 74—5.7)

This invention relates to gyro verticals and particularly pertains to a conditioning arrangement effective when the instrument is started from a standstill condition to bring the rotor up to normal operating speed quickly and to set the rotor frame in an approximately correct position.

An object of the invention is to shorten the conditioning period heretofore required of an instrument of this character so that it is usable as a reference within a relatively short time after starting. Reference instruments of this character containing the conditioning arrangement are particularly useful in high speed aircraft.

One of the features of the invention resides in the utilization of the pick-offs of a gyro vertical as torque motors during the starting period of the instrument and the provision of a program device operable automatically to convert the pick-offs to torque motors and to restore the pick-offs to normal operation after a predetermined time interval.

A further feature of the invention is provided by an energizing arrangement whereby when the selsyn type pick-offs are functioning as torque motors the rotor and stator windings are independently excited.

Still a further feature of the invention resides in supplementing the torque of the erecting means and/or the quick setting pick-offs during the starting period of the instrument by a torque due to the reaction of the gyroscopic rotor to acceleration as the same is brought up to normal operating speed from a standstill condition by its spinning means.

Other objects, features and structural details of the invention will be apparent from the following description when read in relation to the accompanying drawings, wherein:

Fig. 1 is a schematic view and wiring diagram showing a preferred embodiment of the present invention.

Fig. 2 is a diagram illustrating the sequence of operations of the program device shown in Fig. 1.

Fig. 3 is a vertical section of a gyro vertical in which the improved starting arrangements are incorporated, and Fig. 4 is a plan view of the instrument shown in Fig. 3.

For purposes of illustration, the present invention is shown incorporated in a gyro vertical instrument having an erecting device of the character shown and described in copending application S. N. 670,263, filed May 16, 1946 by C. E. Barkalow. The noted application shows a gyro vertical of the direct indicating type while the one illustrated in the present application is a reference instrument whose pitch and roll information is obtained from pick-offs that form a part of the instrument. As shown in Figs. 3 and 4, the gyro vertical includes a casing or housing, a portion of whose front wall is indicated at 10 and a portion of whose rear wall is indicated at 11. The housing supports a gimbal ring by bearings 12 and 13 with freedom about an axis parallel to or coincident with the fore and aft axis of the craft (not shown) on which the instrument is mounted. Arrow 14 indicates the direction of motion of the craft along its fore and aft axis. The conventional gimbal ring for this type of instrument is indicated at 15. The rotor frame or case 16 of the instrument is supported on the gimbal ring 15 by suitable bearings one of which is indicated at 17 with freedom about a normally horizontal axis perpendicular to the horizontal axis of the gimbal ring 15. The axis of the frame 16 is parallel to or coincident with the lateral or athwartship axis of the craft on which the instrument is mounted.

As shown in Fig. 3, the improved gyro vertical may further include an erecting device of the character described and claimed in the hereinbefore noted pending application. Such device includes a plurality of movable balls 18 situated in a rotatable container 20 located at the bottom of the frame 16. The container 20 is driven by the gyroscopic rotor 21 in the frame 16, the shaft 22 of the rotor being connected thereto by way of suitable reduction gearing indicated at 23. The rotor 21 of the instrument is shown as spinning about an axis that is forwardly inclined 2½ degrees to the vertical when normally positioned. Means are provided to spin the gyroscopic rotor 21. Such means, as shown, may take the form of an alternating current induction motor of the squirrel cage type whose wound stator 24 is fixed to the frame or case 16. The cage type rotor, of the electric spinning motor, indicated at 25 is included as a part of the gyroscopic rotor 21.

As shown, the improved gyro vertical may include electric signal synchros or pick-offs of the selsyn type for providing information as to the roll and pitch attitude of the craft as determined by the position of the craft about its fore and aft and lateral axes relative to the rotor frame 16 of the instrument. The pitch pick-off indicated at 26 in Fig. 4 has a wound stator part 27 fixed to the ring 15. The wound rotor part 28 of this pick-off is fixed to the rotor frame 16. Such a pick-off provides a null signal when the craft is at the reference position determined by the frame 16 relative to its lateral axis. With departure from this position or attitude by the craft, the pick-off 26 provides a signal output whose amplitude depends on the extent of the departure and whose phase depends on the sense of the departure.

A similar pick-off is shown in Fig. 3 at 30 for the axis of the gimbal ring 15 of the instrument. The wound stator of the roll pick-off 30 as indicated at 31 is fixed to the housing of the instrument at the front wall 10. The wound rotor of the pick-off 30 is fixedly connected to the gimbal ring 15. This pick-off detects tilt about the roll axis of the craft and functions in the manner described in connection with pick-off 26.

In accordance with the present invention, the conditioning arrangement effective when the electrically operated gyro vertical is started from a standstill condition includes a starting element or four knife switch indicated at 34 in Fig. 1. Switch 34 receives three phase alternating current electrical energy from a suitable electrical source 35 by way of leads 36, 37 and 38. The switch 34 also receives direct current electrical energy from a suitable source such as a battery (not shown) by way of leads 40 and 36. To facilitate energization of the gyro vertical at a standstill condition, the switch 34 is manually operated and set in its closed position as it is illustrated in Fig. 1. The movable elements of the starting arrangement shown in Fig. 1 are illustrated in these starting positions or the respective positions of the elements at the moment that the starting switch 34 is closed.

A program device is rendered effective by the starting element or switch that includes a direct current motor which operates to drive a series of cams 42, 43, 44, 45 and 46 on cam shaft 47 by way of reduction gears 48 and 50. The cams and the respective cam followers therefor indicated at 52, 53, 54, 55 and 56 provide a sequentially operable means for governing a switching system that controls the energization of the gyro vertical in accordance with a predetermined plan. In Fig. 1, the switches of the system shown are designated at 1, 2, 3, 4, 5, 6, 7, 8, 9, 10 and 11. Fig. 2 indicates the positions of the noted sequence switches over the period of operation of the program device for a preferred starting arrangement such as employed in connection with the described gyro vertical. The ordinate dimension in the sequence diagram of Fig. 2 includes each of the switches 1 through 11 inclusive. The abscissa dimension of the diagram represents time which corresponds to one revolution of the camshaft 47. The time interval from start to stop of the program device may be one minute or other relatively short predetermined time interval depending on the particular gyro vertical in which the starting arrangement is to be used. The solid line representation in Fig. 2 depicts the period over which the single position switches 1, 2, 5, 7, 8, 9, 10 and 11 are closed. The open line representation for the same switches depicts the time that the same are in an open position. For the two position switches 3, 4, and 6, the solid line representation depicts the switches closed in the right position as viewed in Fig. 1. The open line representation for switches 3, 4 and 6, depicts the same in the closed left position in which the same are shown in the drawing.

As shown in Fig. 1, the starting arrangement may also include an alternating current relay 57 having four fixed contacts 58, 59, 60 and 61, four armatures 62, 63, 64, and 65 that are biased by spring 66 when the switch 34 is open so that the respective contacts 58, 59 and 60 and armatures 62, 63, and 64 are in an open position. Armature 65 and contact 61 are situated in a closed position as shown in Fig. 1. The coil of the relay 57 is designated at 67. Upon closure of the switch 34, the program device is included in a starting circuit energized from a direct current source which includes lead 36, switch 34, lead 68, lead 70, contact 61 of relay 57, armature 65 of relay 57, lead 71, motor 41, lead 72, switch 34 and lead 40. With the motor 41 energized, the camshaft 47 starts to turn and the starting program is initiated.

As shown in Fig. 2, the program herein illustrated starts by the opening of switches 10 and 11 which opens the connection, between source 35 and the stator 24 of the spinning means for the gyroscopic rotor 21, that is employed at the end of the starting program when the rotor is spinning at its normal operating speed. This circuit was opened by the master switch 34 after the instrument was last used.

The next step in point of time of the operation of the program device as shown in Fig. 2 is the closing of switch 1. This operates to close a circuit that bypasses the relay 57 in the described starting circuit so that the motor 41 continues to run. The circuit bypassing the relay 57 includes lead 36, switch 34, lead 68 to lead 73, closed switch 1, lead 74 to lead 71, motor 41, lead 72, switch 34 and lead 40.

As the motor 41 continues to operate, the succeeding step in the operation of the program device is the simultaneous closing of switches 2, 5 and 7 and the shifting to the right hand closed position of switches 3, 4 and 6.

Energization of relay 57 is effected by the closure of switch 2 which closes a circuit across two of the alternating current energized leads from the switch 34. This circuit includes source 35, lead 36, switch 34, lead 68, lead 75, the winding 67 of relay 57, lead 76, lead 77, closed switch 2, lead 78, lead 79, switch 34 and lead 38. Energization of the relay 57 moves the armatures 65, 64, 63 and 62 thereof against the action of spring 66. This breaks the described starting circuit by removing armature 65 from its contact 61. Armature 64 then engages contact 60, armature 63 engages contact 59 and armature 62 engages contact 58. With the engagement of armature 62 and contact 58, a holding circuit is rendered effective for the relay 57 so that the same will continue to be energized when the switch 2 of the program device opens. The holding circuit for the relay 57 includes source 35, lead 38, switch 34, lead 79, lead 78, lead 80, contact 58, armature 62, lead 76, winding 67, lead 75, lead 68, switch 34 and lead 36. The relay 57 consequently remains energized after closure of switch 2 as long as the gyro vertical remains in operation. This circuit is not broken until the master switch 34 is opened.

Switch 2, as shown in Fig. 2, remains closed sufficiently long to render the holding circuit including relay 57 effective. As soon as the coil 67 of the relay 57 is energized, switch 2 opens and remains open for the remainder of the program.

In accordance with the present invention, the signal synchros or pick-offs 26 and 30 of the gyroscopic instrument are converted during the operation of the program device so the same function as torque motors to provide quick setting couples for the instrument. The rotor frame 16 of the instrument is universally supported and with the rotor at rest, the position of the spin axis of the rotor relative to the vertical is indeterminate because of the haphazard pendulosity of the frame due to the balls 18 of the erecting device. However, as long as the stator and rotor parts of the pick-offs 26 and 30 are displaced from their electrical zero, that is when the synchros would normally provide either pitch and/or roll signals, the same are effective to exert setting torques about the axis of the frame 16 and about the axis of the ring 15. These torques act directly to position the rotor case when the rotor is not spinning. When the rotor is spinning the torques are effective to precess the rotor frame to its proper position relative to the casing or housing of the instrument. The torques obtained from the pick-offs per se are not sufficient to erect the rotor frame as quickly as desired so that supplementary provisions are also included herein for erecting the rotor frame as hereinafter described.

As noted in Fig. 2 with the closing of switch 2 in the program, the switches 5 and 7 are closed simultaneously and the arms of the switches 3, 4 and 6 are moved from the closed left position as viewed in Fig. 1 to the closed right position. This operation on the part of the program device converts the pick-offs 26 and 30 to torquing devices or motors. The cam controlled switches 3, 4, 5, 6 and 7 of the program device provide a sequentially operable means for first converting the pick-offs 26 and 30 to torque motors and then restoring the pick-off to normal operation at the desired time. During the time interval that the pick-offs 26 and 30 function as torque motors, the wound stator and rotor parts thereof are independently excited or energized at different voltage levels to obtain maximum torquing characteristics thereof. The rotor parts of the synchros are preferably excited at a higher than normal voltage level and the stator parts at a corresponding voltage level. As shown in Fig. 1, the circuit including the rotor 32 of pick-off 30 is energized at a relatively high voltage level from an auto-transformer 81 connected across the leads 68 and 79. Lead 82 is tapped to the transformer 81, which connects to lead 83 when switch 3 is closed in its right position. The rotor 32 is connected across leads 83 and 68 by way of leads 84 and 85. The rotor 28 of pick-off 26 is situated in parallel to the rotor 32 of pick-off 30. Rotor 28 is energized similarly to rotor 32, the same being connected across leads 83 and 68 by way of leads 86 and 87. The stator parts 31 and 27 of the respective pick-offs are energized at a proportionately high voltage level relative to the rotor parts. The circuit including the stator 31 of pick-off 30 is provided by lead 88 tapped to transformer 81, lead 89, switch 5 in its closed position, lead 90, the stator 31 of pick-off 30, and lead 91 to lead 85 connecting with lead 68. The third winding for the stator of selsyn pick-off 30 is connected to lead 68 by lead 94, switch 4 closed in the right hand position, and lead 95 to lead 68'. The circuit including the stator 27 of pick-off 26 is provided by lead 88 from transformer 81, lead 89, switch 7 in its closed position, lead 92, the stator 27 of pick-off 26, lead 93 to lead 87 connecting with lead 68. The third of the windings of the stator of the selsyn pick-off 26 is connected to lead 68 by lead 97, switch 6 closed in right hand position and lead 68'. The pick-offs 26 and 30 energized from the source 35 by way of transformer 81 are thusly conditioned to function as quick setting devices for the instrument which operate to move the rotor frame so that the spin axis of the rotor is within 15 degrees of its normal position before the rotor starts to spin.

To accelerate the setting of the rotor frame, the next step in the operation of the program device is to temporarily energize the spinning motor for the gyroscopic rotor. This action starts the rotor spinning and brings the same up to approximately 500 R. P. M. The erecting device shown in Fig. 3 is directly driven by the rotor of the instrument at a speed proportional to the speed of rotation of the rotor. The erecting device is of a character that erects at a greater than normal rate when the speed of rotation of the rotor is below normal. In order to obtain advantage of this condition, the gyroscopic rotor is controlled to coast for a predetermined period instead of being accelerated up to full speed immediately. Also, in order to get the rotor 21 up to speed quickly provision is included herein for over-energizing the stator 24 of the spinning means for the rotor.

As herein shown, the circuit connecting the stator 24 of the rotor spinning motor to the A. C. source includes a power transformer 98, the switches 8, 9, 10 and 11 and the relay 57. The spinning means for the rotor normally operates at 115 volts but with the power transformer in the circuit the voltage is raised for the starting period to 175 volts which temporarily overenergizes the spinning means. The time for the rotor to reach normal operating speed is decreased by this arrangement. As indicated in Fig. 2, the next step in the operation of the program device is the closure of switches 8 and 9. With relay 57 energized and contacts 59, 60 closed with the respective armatures 63, 64, a circuit from source 35 to the stator 24 of the rotor spinning means is completed which includes lead 99 connected to armature 63, lead 100, switch 8 in closed position and lead 101 to the primary of the transformer 98, lead 102 from the secondary of the transformer, and lead 103 to the stator. A second circuit is completed to the stator 24 of the rotor spinning means from the source 35 which includes lead 37, switch 34, lead 104, the engaged contact 60 and armature 64 of relay 57, lead 105, lead 106, closed switch 9, lead 107 to the primary of transformer 98, lead 108 from the secondary of the transformer 98 and lead 109 to the stator. The third connection is provided by common lead 68 between source 35 and the stator of the rotor spinning means. Lead 110 connects the transformer 98 and the lead 68. With the described circuits closed, the rotor spinning means is momentarily energized to accelerate the rotor to a speed of approximately 500 R. P. M. As shown in Fig. 2, the circuits are then opened by the reopening of the switches 8 and 9 and the rotor is permitted to coast at this low speed to obtain the increased erection rate from the erecting means which is now effective due to the fact that the rotor is turning. There is an initial disturbing kick about the axis of the rotor frame caused by reaction to the starting of the rotor from a standstill condition. This kick is quickly corrected by the supplementary action of the erecting device acting at an increased rate and the quick setting pick-offs 26 and 30.

The next step in the operation of the program device is the reclosing of switches 8 and 9 as indicated in Fig. 2. This restores the hereinbefore described circuits by which the stator of the rotor spinning means is overenergized to bring the same up to normal operating speed quickly. At this time, the acceleration of the rotor produces no disturbing kick due to the fact that the rotor is already spinning. It has been found that upon reclosure of the switches 8 and 9, the acceleration of the rotor actually provides a reaction torque about the axis of the rotor frame that supplements the torque of the erecting means and the quick setting pick-offs to further assist in the setting of the frame.

The program device is next effective to restore the pick-offs 26 and 30 to normal operation. This is accomplished by the opening of switches 5 and 7 and the shifting of the arms of switches 3, 4 and 6 to a closed left hand position, as viewed in Fig. 1, in which the same are shown in the drawing. The rotor 32 of roll pick-off 30 is then energized by way of lead 88 to the transformer 81, switch 3 closed in its left hand position, lead 83, lead 84, rotor 32, and lead 85 to lead 68. The parallel arranged rotor 28 for pitch pick-off 26 is similarly energized by way of lead 83, lead 86, rotor 28 and lead 87 to lead 68. The signal output of the roll pick-off 30 is obtained from the stator 31 by way of lead 94, switch 4 closed in its left hand position and output lead 111. The pitch signal is obtained from the stator 27 of pick-off 26 by way of lead 97, switch 6 closed in its left hand position and output lead 112. The signals of the pick-offs 26 and 30 may be used to operate indicators or to control the surface of an aircraft through an automatic pilot or used in other conventional manners well known to the art.

With the rotor up to speed and the frame properly set, the program is completed by opening switches 8 and 9 and closing switches 10 and 11 which by-passes the transformer 98 and connects the stator 24 of the rotor spinning means directly to the source 35 to permit normal energization of the same. This circuit is closed through the relay 57 and includes lead 105, closed switch 11 and lead 113 to lead 109 and the stator 24. It also includes lead 99, closed switch 10, lead 114 to lead 103 to the stator. Lead 68 remains common and directly connects the stator 24 and the source 35.

Upon completion of the program, switch 1 opens and the parts appear as shown in Fig. 1 except for the relay 57 which is now energized. Switch 1 opens the circuit including the program motor 41 which then stops at the end of the predetermined time interval for the starting arrangement which corresponds to one revolution of the cam shaft 47.

With switch 34 closed and relay 57 energized, the instrument functions in a known manner. At the completion of its operation, switch 34 is opened and this restores the relay 57 to function again as herein described.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyro vertical having a rotor, rotor spinning means and an erecting device driven by said rotor of the character whose erection rate below normal operating speed is greater than it is at normal operating speed; a starting arrangement including means for operating said spinning means to start the rotor from a standstill condition, and means for rendering said operating means ineffective to permit said rotor to coast at a speed less than normal for a predetermined time interval.

2. In a starting arrangement for gyro verticals having electrical pick-offs and a starting switch connected to a source of electrical energy, the combination of, a converting circuit, a restoring circuit, switching means for the circuits by which one or the other connects the pick-offs and starting switch, and means effective upon closure of said starting switch for sequentially conditioning said switching means to firstly close said converting circuit to convert the pick-offs to torque motors to provide quick setting couples for the gyro vertical and to secondly close said restoring circuit to restore the pick-offs to normal operation.

3. In a starting arrangement for gyro verticals having electrical pick-offs, and a starting switch connected to a source of electrical energy, the combination of, a converting circuit, a restoring circuit, switching means for the circuits by which one or the other connects the pick-offs and starting switch, means for sequentially conditioning said switching means including a drive motor, a motor circuit closed with closing of said starting switch, and a third switch operable upon expiration of a predetermined time interval for opening said motor circuit, said drive motor operating said switch conditioning means upon closure of said starting switch to sequentially condition said switching means to firstly close said converting circuit to convert the pick-offs to torque motors to provide quick setting couples for the gyro vertical and to secondly close said restoring circuit to restore the pick-offs to normal operation.

4. In a starting arrangement for gyro verticals having electrical pick-offs with wound stators and rotors and a starting switch connected to a source of electrical energy, the combination of, a converting circuit including means for energizing the stators and rotors of the pick-offs at different voltage levels, a restoring circuit, switching means for the circuits by which one or the other connects the pick-offs and starting switch, and means effective upon closure of said starting switch for sequentially conditioning said switching means to first close said converting circuit to convert the pick-offs to torque motors to provide quick setting couples for the gyro vertical and to secondly close said restoring circuit to restore the pick-offs to normal operation.

5. In a starting arrangement for gyro verticals having electrical pick-offs with wound stators and rotors, a starting switch connected to a source of electrical energy, and a circuit between said starting switch and pick-offs by which said pick-offs are initially utilized as torque motors including means for exciting the stators and rotors of the pick-offs at different voltage levels.

6. An arrangement as claimed in claim 5, in which said different voltage level exciting means is a transformer and the rotors are excited at a higher voltage than the stators.

7. In a starting arrangement for gyro verticals having a gyroscopic rotor, electric motive means for spinning the rotor, electrical pick-offs, and a starting switch connected to a source of electrical energy, the combination of, a pick-off converting circuit, a pick-off restoring circuit, first switching means for the circuits by which one or the other connects the pick-offs and starting switch, a circuit connecting said rotor spinning means and starting switch including second switching means, and means effective upon closure of said starting switch for sequentially conditioning said first and second switching means to firstly close said converting circuit to convert the pick-offs to torque motors to provide quick setting couples for the gyro vertical, to secondly close said circuit to said electric motive means to spin the rotor, and to thirdly restore the pick-offs to normal operation.

8. In a starting arrangement for gyro verticals having a gyroscopic rotor, electric motive means for spinning the rotor, electrical pick-offs, and a starting switch connected to a source of electrical energy, the combination of, a pick-off converting circuit, a pick-off restoring circuit, first switching means for the circuits by which one or the other connects the pick-offs and starting switch, an overenergizing circuit for the rotor spinning means, a normal energizing circuit for the rotor spinning means, second switching means for the circuits for the rotor spinning means by which the circuits connect the spinning means and starting switch, and means effective upon closure of said starting switch for sequentially conditioning said first and second switching means to firstly close said converting circuit to convert the pick-offs to torque motors to provide quick setting couples for the gyro vertical, to secondly close said overenergizing circuit for said rotor spinning means to accelerate the rotor to provide a reaction torque for the gyro vertical that supplements the action of the converted pick-offs, to thirdly restore the pick-offs to normal operation, and to fourthly normally energize said rotor spinning means.

9. In a starting arrangement for gyro verticals having a rotor, electrical rotor spinning means, an erection device driven by said rotor of the character whose erection rate below normal operating speed is greater than it is at normal operating speed, and a starting switch connected to a source of electrical energy, the combination of, a circuit connecting said rotor spinning means and starting switch including switching means, and means effective upon closure of said starting switch for sequentially conditioning said switching means to firstly close said rotor spinning means circuit momentarily to spin the rotor and drive the erecting means at its below normal operating speed, to secondly open the circuit to the rotor spinning means to permit the rotor to coast at a speed less than normal for a predetermined time interval and, to thirdly reclose the circuit to the rotor spinning means to bring the rotor up to normal operating speed.

10. In a starting arrangement for gyro verticals having a rotor, electrical rotor spinning means, an erection device driven by said rotor of the character whose erection rate below normal operating speed is greater than it is at normal operating speed, and a starting switch connected to a source of electrical energy, the combination of, an overenergizing circuit for the rotor spinning means, a normal energizing circuit for the rotor spinning means, switch means for the circuits for the rotor spinning means by which the circuits connect the spinning means and starting switch, and means effective upon closure of said starting switch for sequentially conditioning said switching means to firstly close said rotor spinning means overenergizing circuit to accelerate the rotor and drive the erecting means at its below normal operating speed, to secondly open the circuit to the rotor spinning means to permit the rotor to coast at a speed less than normal for a predetermined time interval, to thirdly reclose the overenergizing circuit to the rotor spinning means to accelerate the rotor to provide a reaction torque for the gyro vertical that supplements the action of the erecting means, and to fourthly close the normal energizing circuit to the rotor spinning means.

11. In a gyro vertical having a rotor, rotor spinning means and an erecting device driven by said rotor of the character whose erection rate below normal operating speed is greater than it is at normal operating speed; a starting arrangement including means for operating said spinning means to start the rotor from a standstill condition, means for rendering said operating means ineffective to permit said rotor to coast at a speed less than normal for a predetermined time interval, and means for restoring said spinning means to said operating means to accelerate the rotor to normal operating speed and provide a reaction torque for the gyro vertical that supplements the action of the erecting means.

12. In a gyro vertical, a starting arrangement having a plurality of control switches for the gyro vertical, a starting switch connected to a source of electrical energy, means for sequentially operating said control switches including motive means, a starting circuit including a relay connecting said motive means and starting switch, a holding circuit for said relay, and a circuit bypassing said relay including switching means operable to open the starting circuit for said motive means upon expiration of a predetermined time interval after the starting switch is closed.

ARTHUR W. LANE.

REFERENCES CITED

The following references are of record in the file of this patent:

UNITED STATES PATENTS

| Number | Name | Date |
|---|---|---|
| 2,278,379 | Koster | Mar. 31, 1942 |
| 2,344,126 | Carlson | Mar. 14, 1944 |
| 2,441,307 | Alkan | May 11, 1948 |

FOREIGN PATENTS

| Number | Country | Date |
|---|---|---|
| 597,282 | Great Britain | Jan. 22, 1948 |